(12) United States Patent
Dobkin et al.

(10) Patent No.: US 8,619,400 B2
(45) Date of Patent: Dec. 31, 2013

(54) CIRCUITRY TO PREVENT OVERVOLTAGE OF CIRCUIT SYSTEMS

(75) Inventors: Robert Curtis Dobkin, Monte Sereno, CA (US); David Henry Soo, Los Altos, CA (US)

(73) Assignee: Linear Technology Corporation, Milpitas, CA (US)

( * ) Notice: Subject to any disclaimer, the term of this patent is extended or adjusted under 35 U.S.C. 154(b) by 101 days.

(21) Appl. No.: 13/424,116

(22) Filed: Mar. 19, 2012

(65) Prior Publication Data

US 2012/0287540 A1 Nov. 15, 2012

Related U.S. Application Data

(60) Provisional application No. 61/485,283, filed on May 12, 2011.

(51) Int. Cl.
*H02H 9/04* (2006.01)
(52) U.S. Cl.
USPC ........................................................ 361/91.1
(58) Field of Classification Search
USPC ........................................................ 361/91.1
See application file for complete search history.

(56) References Cited

U.S. PATENT DOCUMENTS

| | | | | |
|---|---|---|---|---|
| 5,539,610 | A | * | 7/1996 | Williams et al. ............... 361/246 |
| 2002/0021150 | A1 | * | 2/2002 | Tuchiya et al. ............... 327/108 |
| 2003/0042938 | A1 | * | 3/2003 | Shvarts ........................ 327/108 |
| 2009/0261798 | A1 | * | 10/2009 | Sachdev et al. ............... 323/288 |

* cited by examiner

*Primary Examiner* — Scott Bauer
(74) *Attorney, Agent, or Firm* — McDermott Will & Emery LLP

(57) ABSTRACT

An overvoltage protection method and circuit includes a positive supply input node, an output node, and a negative supply node. The overvoltage protection circuit further includes a first functional circuit configured to turn ON a MOSFET and maintain it in a low resistance state. A second functional circuit is configured to detect an overvoltage and control the gate of the MOSFET to regulate a voltage at the output node. A third functional circuit is configured to provide a startup wherein the overvoltage protection circuit is not damaged and/or to regulate an operating voltage such that an overvoltage does not appear on the overvoltage protection circuit. The external components include the MOSFET, which has a gate coupled to the output of the charge pump of the overvoltage protection circuit.

39 Claims, 2 Drawing Sheets

CIRCUITRY TO PREVENT OVERVOLTAGE OF CIRCUIT SYSTEMS

RELATED APPLICATIONS

This application claims the benefit of U.S. Provisional Application No. 61/485,283, filed on May 12, 2011, the disclosure of which Application is incorporated by reference herein.

TECHNICAL FIELD

This disclosure generally relates to prevention of overvoltage of circuit systems and more particularly to circuit systems where the overvoltage protection circuit is isolated from the supply and ground.

DESCRIPTION OF RELATED ART

Electronic circuit systems can be vulnerable to damage by transient voltage spikes. If a voltage rises above a safe threshold, the circuit system protection circuitry attempts to limit the voltage supplied to an electronic circuit system by either blocking or by shorting to ground any unwanted voltage above a safe threshold.

While circuitry that protects electronic circuit systems exists, protection at voltages higher than the breakdown of the overvoltage protection circuit may require a different approach. Typically, circuitry that controls the protection is limited in the amount of voltage it can protect against. Accordingly, there is a need for a control and protection circuit that can operate at a low voltage and is capable of controlling a high voltage MOSFET to protect against high voltage transients in circuit systems.

SUMMARY

An overvoltage protection circuit and method is provided. Protection circuitry may include several different operating functional circuits. For example, a first functional circuit may turn "ON" a PASS MOSFET and provide that it is in a low resistance state, dropping a very low voltage across the MOSFET. A charge pump may drive the gate of the MOSFET in normal operation, maintaining it "ON" in a low "ON" resistance state. A second functional circuit may detect the overvoltage, control the gate of the MOSFET to regulate the output, start timers to prevent the MOSFET from overheating (i.e., due to power), and provide a cool-down function if the MOSFET overheats during the protection cycle. Further, a third functional circuit may provide for an orderly startup of the internal circuitry for protection when voltage is applied to the system. This internal circuitry may regulate its operating voltage such that the high voltage does not appear on the load of an overvoltage protection system.

In one embodiment, the protection circuitry may be powered by a resistor from the input supply to the control circuitry and another resistor from the control circuitry to ground. An internal shunt regulator may regulate the voltage across the control circuitry to a low voltage. This voltage may be sufficient to supply power to the internal circuitry of the overvoltage protection circuit. The protection circuit may include a reference circuitry, amplifier circuitry, charge pump circuitry, and controls for the gate of the MOSFET.

These, as well as other components, steps, features, objects, benefits, and advantages, will now become clear from a review of the following detailed description of illustrative embodiments and the accompanying drawings.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

The various examples discussed below provide protection of overvoltage for electronic systems. The overvoltage protection circuitry can operate substantially independently of its voltage rating, thereby providing unlimited overvoltage protection on an electronic load. Put differently, the overvoltage protection circuit operates independently of external overvoltage. The overvoltage protection circuitry uses an adjustable floating topology to enable high voltage operation.

The overvoltage protection circuit distributes power to loads safe from overvoltage transients. Further, the overvoltage protection circuit includes two shunt regulators that are coupled with external voltage dropping resistance elements $R_{SS}$ 120 and $R_{IN}$ 108 to help protect the overvoltage protection circuit itself from external overvoltage. The overvoltage protection circuit can be best explained through three states of operation. In this regard, FIGS. 1a to 1c provide simplified diagrams illustrating three states of operation: the start mode (e.g., when the overvoltage protection circuit 102 is powered ON), run mode (e.g., during normal operation of the overvoltage protection circuit 102), and regulate mode (e.g., when there is an overvoltage event).

Figure 1A:
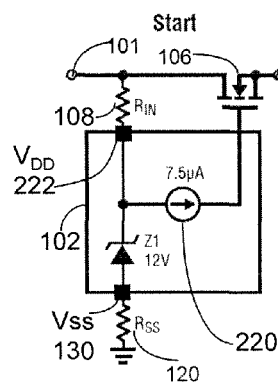
FIG. 1a illustrates a simplified diagram of an overvoltage protection system in start mode, consistent with an embodiment of the invention.
Figure 1B:
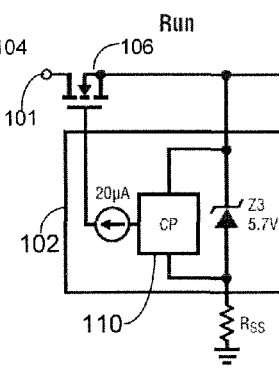
FIG. 1b illustrates a simplified diagram of an overvoltage protection system in run mode, consistent with an embodiment of the invention.
Figure 1C:
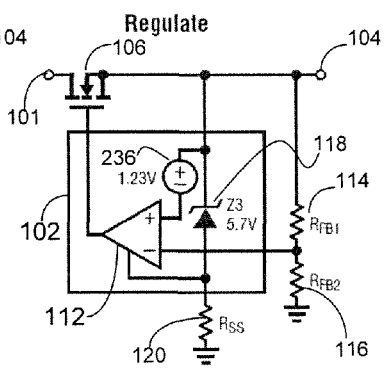
FIG. 1c illustrates a simplified diagram of an overvoltage protection system in regulate mode, consistent with an embodiment of the invention.

FIG. 1a illustrates an overvoltage protection circuit 102 having a positive supply node $V_{DD}$ 222 coupled to an external resistance element $R_{IN}$ 108, which is coupled to an external input 101. The overvoltage protection circuit of FIG. 1a has a negative supply node $V_{SS}$ 130 coupled through an external resistance element $R_{SS}$ 120 to ground. During a first mode of operation (i.e., start up), the relevant circuit blocks in the overvoltage protection circuit 102 are protected from an overvoltage at the input 101 by clamping the voltage between the positive supply node 222 and the negative supply node 130 by a shunt 202. Thus, the overvoltage protection circuit 102 floats with the voltage at the input 101. Since the overvoltage protection circuit is not affected by the overvoltage at the input 101, it can effectively regulate MOSFET 106 such that there is no overvoltage at any load that may be connected to output 104.

Prior art surge protectors are generally powered off an input supply, thereby limiting the surge voltage to the breakdown voltage of the input pins of the overvoltage protection circuit. In contrast, as illustrated for example in the run mode FIG. 1b and the regulate mode FIG. 1c, a substantial part of the overvoltage protection circuit 102 is powered off the output 104. Thus, the MOSFET 106 isolates the surge from the power pins of the overvoltage protection circuit 102. Such isolation allows surge voltages up to the breakdown voltage of the external MOSFET 106.

For example, in the start mode (i.e., FIG. 1a), a small trickle current (e.g., 15 μA) flows through Input resistance element $R_{IN}$ 108. As to the resistance element 108, it can be a resistor or constant current source transistor (e.g., JFET). Half of the current 220 may be used to charge the gate of MOSFET 106 and the other half as bias current for the logic supply 204 and all blocks that connect to $V_{CC}$ (e.g., Logic and Timer 232, Shutdown Comparator 216, timer comparator 230, and current sources). As the pin at the gate 218 of MOSFET 106 charges, the MOSFET 106 brings up the voltage at the output 104. The source of the MOSFET 106 follows the gate during ramp-up. The return voltage $V_{SS}$ 130 is capacitively coupled to the output 104 (via capacitor $C_1$ 210 shown later in FIG. 2), ramping up in accordance with the voltage at the output 104. When the $V_{SS}$ 130 voltage increases, the current In resistance element $R_{SS}$ 120 increases. For example, the resistance element can be a resistor or constant current source device such as a JFET. Any current in $R_{SS}$ 120 that exceeds the quiescent current for the overvoltage protection circuit 102 (the current drawn by the overvoltage protective circuit 102) may charge $C_1$ 210. Subsequently, the current that exceeds the quiescent current for the overvoltage protection circuit may pass through a shunt regulator Z3 (illustrated in FIG. 1c). Thus the $R_{SS}$ current that exceeds the quiescent current passes through the shunt regulator after $C_1$ 210 is charged to the shunt 118 voltage (e.g., 5.7V). For example, the shunt regulator may be 5.7V. Put differently, the voltage at the output 104 may be pulled up by the MOSFET 106 and the return voltage Vss 130 may be pulled low by the $R_{SS}$ 120. Capacitor $C_1$ (210) is coupled between Vout 104 and Vss 130, and is clamped by Zener 118 at a predetermined voltage (e.g., 5.7V) below the output voltage 104. This is the first configuration where the overvoltage protection circuit 102 regulates its own operating voltage such that the overvoltage protection circuit 102 operates independently of the voltage rating of the internal components of the overvoltage protection circuit 102.

This ramp-up leads to the run mode of the overvoltage protection circuit 102 (as illustrated in FIG. 1b), where the output 104 is high enough to supply sufficient voltage to the charge pump 110 of the overvoltage protection circuit 102. The charge pump 110 may then be used to charge the gate of MOSFET 106 above the source by a predetermined level (e.g., 12V). Thus, once capacitor $C_1$ 210 (shown in FIG. 2) is charged above a predetermined voltage, the charge pump 110 may be enabled. This may triple the gate charging current. For example, the predetermined voltage may be 4.75V. The charge pump 110 drives the gate of the MOSFET 106 above the input supply voltage at input 101 by a second predetermined voltage, ensuring it is in the low ON resistance state. The second predetermined voltage may be 12V.

When the voltage at the output 104 is substantially equal to the voltage at the input 101, the load connected to output 104 can be protected from an input 101 overvoltage. In the regulate mode, illustrated in FIG. 1c, the overvoltage regulation amplifier 112 may be referenced to the output 104 through a reference voltage (e.g., 1.23V). For example, if the voltage drop across the upper feedback resistor, $R_{FB1}$ (114) exceeds the reference voltage 236 (1.23V in this example), the overvoltage regulation amplifier 112 pulls the gate down to regulate the $R_{FB1}$ (114) voltage (i.e., voltage at FB node 224) back to the reference voltage of 1.23V. Thus, the voltage at the output 104 is clamped by setting the proper ratio between $R_{FB1}$ (114) and $R_{FB2}$ (116). The reference 236 and the overvoltage regulation amplifier 112 are essentially powered by the capacitor $C_1$ 210. They are enabled when the capacitor 210 is charged to a predetermined voltage (e.g., 2.55V). The overvoltage reference amplifier 112 monitors the OUT 104 voltage using two feedback resistors $R_{FB1}$ 114 and $R_{FB2}$ 116.

In one example, if the voltage at the output 104 is regulated at 100V, then the voltage drop across the $R_{FB2}$ (114) is 98.77V. If the Zener Z3 (118) is 5.7V then the voltage drop across Rss (120) is 94.3V (i.e., 100V−5.7V). Thus, when the output is at a high voltage, the majority of the voltage is dropped across the two resistors $R_{FB2}$ (116) and $R_{SS}$ (120). Accordingly, the overvoltage protection circuit 102 floats up with the supply.

Figure 2:
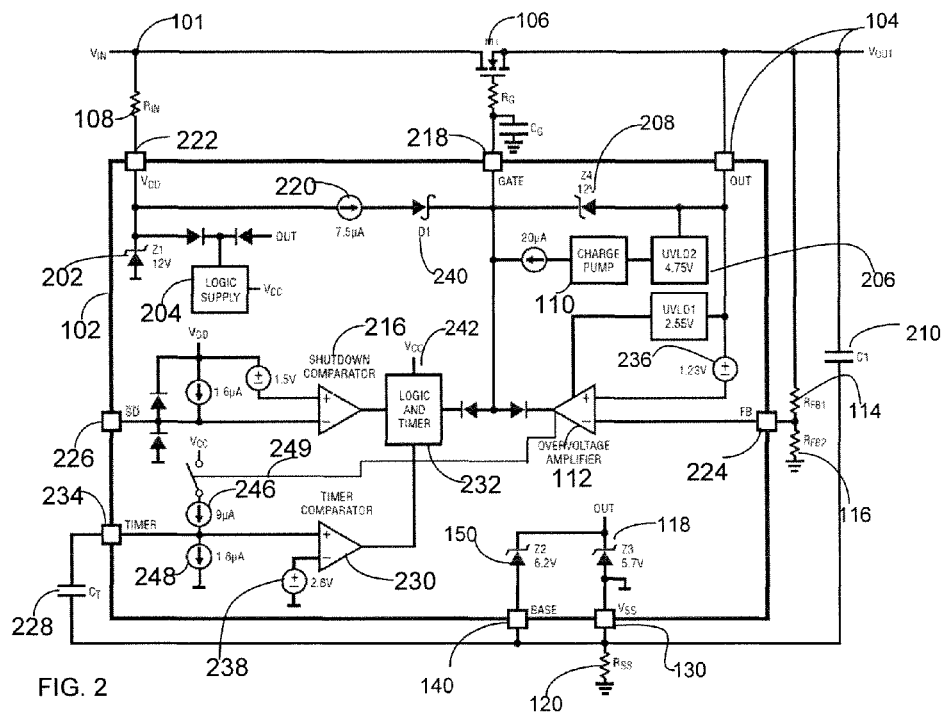
FIG. 2 illustrates an exemplary functional diagram of an overvoltage protection system, consistent with an embodiment of the present invention.

FIG. 2 illustrates an exemplary functional diagram of an overvoltage protection circuit connected to external components, consistent with an embodiment of the present invention. In this example, the external resistor $R_{IN}$ 108 is connected to the $V_{DD}$ pin 222 of overvoltage protection circuit 102. The current through $R_{IN}$ 108 powers up the shunt regulator (zener 202) which then powers up the logic supply 204, providing Vcc. Shunt regulator 202 provides an "always alive" $V_{CC}$ supply 242 to the logic and timer block 232. The logic and timer block 232 is reset during power on reset when an overvoltage fault is cleared. After verifying that the shutdown input is not active, the GATE pin 218 is charged with a predetermined current (e.g., 7.5 μA) from $V_{DD}$ 222. This is consistent with the start mode.

In the example of FIG. 2, once the voltage difference between $V_{OUT}$ 104 to Vss 130 exceeds a predetermined threshold (e.g., 2.55V), the overvoltage regulation amplifier 112 is enabled. Next, the UVLO2 (206) threshold (e.g., of 4.75V) is crossed and the charge pump 110 turns ON. The UVLO2 is a comparator and a 4.75V reference monitoring voltage between the output 104 and $V_{SS}$ 130. For example, the charge pump 110 charges the GATE pin 218 with 20 μA to reach its final value of 12V above the voltage of the output 104 (which may be clamped by Zener Z4 (208)). This charging of the GATE pin 218 allows the capacitor 210 to charge until it is clamped by Z3 (118) to Z3's breakdown voltage (e.g., 5.7V). In this run mode, the MOSFET 106 is configured as a low resistance pass transistor. In this mode, the MOSFET 106 has little voltage drop and power dissipation.

Once powered up, the overvoltage protection circuit 102 is ready to protect a load that may be coupled to $V_{OUT}$ 104 against an overvoltage transient event. The overvoltage regulation amplifier 112 monitors the load voltage between output 104 and ground by sensing the voltage on the Feedback (FB) pin 224 with respect to the output 104, as a voltage drop across $R_{FB1}$ (114). In an overvoltage situation, the voltage at $V_{OUT}$ 104 rises until the overvoltage regulation amplifier 102 drives the gate of the MOSFET 106 to regulate and limit the voltage at output 104. This is consistent with the regulation mode.

While the MOSFET 106 is regulated, there may be heating, depending on the load current and the magnitude of the overvoltage. In this regard, to protect the MOSFET 106, the regulation time may be limited by ramping the charge on the capacitor $C_T$ 228 until the TIMER pin 234 exceeds a reference voltage 238 (e.g., 2.8V). Thus, the Logic/Timer block 232, comparator 230 and capacitor $C_T$ 228 provide low pass filtering. In one example, the comparator 228 uses a 9 µA/1.8 µA current sources (246 and 248 respectively) to charge/discharge capacitor $C_T$ 228. If the Overvoltage signal 249 is noisy, it charges the capacitor 228 at 9 µA and discharges at 1.8 µA, providing the effect of low pass filtering of the noisy Overvoltage signal until the 2.8V threshold is met/crossed. The actual filtering is provided by the timer comparator 230 with the capacitor 228. The voltage source 238 provides the desired reference voltage.

For example, the regulation time may be limited by ramping the capacitor $C_T$ 228 with a current (e.g., 9 uA) via the Timer/Logic block 232 until the TIMER pin 234 exceeds a predetermined voltage (e.g., 2.8V). Once the TIMER pin threshold is crossed, a fault state may be entered. This clamps the GATE 218 to OUT 104 for a MOSFET 106 cool-down time. For example, the cool-down time may be 10 sec. Put differently, in a fault state, the Logic/Timer block 232 provides a cool-down time for the MOSFET 106. Further, the Logic/Timer block 232 provides a filter time (e.g., 1 ms) before the shutdown (SD) comparator 216 activates a shutdown. The SD comparator 216 checks the status of the $\overline{SD}$ pin. Further, it signals the LOGIC/TIMER block 232 that a shutdown is requested.

At power up, the Logic/Timer block 232 is powered from the VDD pin 222, which may be powered through the resistor $R_{IN}$ 108. The LOGIC/TIMER block 232 has a small (e.g., less than 10 µA) quiescent current to prevent loading the resistive supply 108. Further, it prevents logic generated shoot-through current. For example, shoot-through current is limited by including current limiting devices (not shown) between the individual logic gates and the $V_{CC}$ supply rail. The current limiting devices can be set to 1 to 2 µA.

During the regulation mode, the excess voltage is provided across the MOSFET 106. In this regard, overheating of the MOSFET 106 is prevented by the overvoltage protection circuit 102. For example, in one embodiment, the overvoltage protection circuit 102 limits the overvoltage regulation time through the TIMER pin 234. The TIMER pin 234 is charged with a current (e.g., 9 µA) until the pin 234 exceeds a predetermined threshold (e.g., 2.8V). When the predetermined threshold is reached/exceeded, the timer comparator 230 sets an overvoltage fault signal, the MOSFET 106 is turned OFF and the overvoltage protection circuit 102 enters a cool-down period (e.g., 9 seconds). During this cool-down period, the logic and timer block 232 is active while the GATE pin is pulled to the same level as the output 104.

In one embodiment, the overvoltage fault signal remains set until the SD pin is toggled. Once the fault is cleared, the GATE pin 218 is permitted to turn the MOSFET 106 ON again. In another embodiment, the overvoltage fault signal is automatically reset and restarted after a predetermined period (e.g., 9 seconds).

In one example, overvoltage protection circuit 102 also uses two shunt regulators (i.e., 202 and 118) coupled with the external voltage dropping resistors $R_{SS}$ 120 and $R_{IN}$ 108, to generate internal supply rails at the $V_{DD}$ 222 and OUT 104 pins. These shunt-regulated rails allow overvoltage protection from unlimited high voltage transients irrespective of the voltage rating of the overvoltage protection circuit 102 components.

In one example, during an overvoltage event, the voltage at the output 104 is clamped by regulating the gate of the MOSFET 106. As the supply increases, the $V_{DD}$ 222 voltage may be pulled high by the resistor $R_{IN}$ 108. Any current in $R_{IN}$ 108 that exceeds the $V_{DD}$ 222 quiescent current, passes through a shunt regulator Z1 (202). For example, the shunt regulator $Z_1$ may be 12V. Put differently, the voltage at $V_{DD}$ 222 is pulled high by the $R_{IN}$ 108 until the voltage is clamped at the regulator Z1 (202) voltage (e.g., 12V) above the return voltage. This is the second configuration in which the overvoltage protection circuit 102 protects its internal circuitry.

At the beginning of start-up, during shutdown, or after an overvoltage fault, the GATE pin 218 is clamped to the OUT pin 104, thereby shutting OFF the MOSFET 106. This allows the Vss 130 and OUT 104 pins to be pulled to ground by the load at the output 104 and Rss 120. During such a condition, the $V_{DD}$ pin 222 may be clamped with a shunt regulator 202 (e.g., 12V) to Vss 130. The full supply voltage minus this 12V from the shunt regulator is then applied to the $R_{IN}$ resistor 108, which sets the shunt 202 current. For example, the shunt current can be as high as 10 mA, which may be several orders of magnitude higher than the typical $V_{DD}$ pin quiescent current (e.g., 9 µA).

In the "run" mode, the voltage at the output 104 is equal to the input supply 101. When capacitor C1 (210) is fully charged, the current $I_{C1}$ through capacitor 210 is zero. In this regard, the voltage between the OUT 104 and Vss 130 pins is clamped with a shunt regulator 118 (e.g., 5.7V). For example, the input voltage supply 101 minus 5.7V is provided on $R_{SS}$ 120. The $R_{SS}$ 120 current may be divided into three areas: (i) the 5.7V shunt current, (ii) bias current between OUT and Vss, and (iii) the $R_{IN}$ 108 current. For example, the 5.7V shunt current can be as high as 10 mA, which substantially exceeds the typical OUT bias current (e.g., 160 µA).

In one embodiment, the voltage between the $V_{DD}$ 222 and $V_{SS}$ 130 pins is shunt regulated (e.g., to 12V) after ramping up the input supply (101). Next, the internally generated supply, $V_{cc}$, may provide a power-on-reset pulse (e.g., of 30 µs duration) that clears a fault latch in the logic and timer block 232, and initializes internal latches. Next, the shutdown comparator 216 may determine if the $\overline{SD}$ pin is pulled low externally, thereby requesting a low bias current shutdown state. Otherwise the external MOSFET 106 is allowed to turn ON.

For example, turning ON the GATE 218 pull up current source 220 (e.g., 7.5 µA) from the VDD pin 222 commences a "bootstrapped" method for powering up the MOSFET 106 gate. Once the GATE 218 reaches the VDD pin 222 voltage (minus a Schottky diode 240 drop), the 7.5 µA source 220 loses voltage headroom and stops charging the GATE 218. This bootstrap method of charging GATE 218 relies on charging capacitor C1 (210) to a sufficient voltage after the GATE 218 voltage stops increasing. The voltage on C1 (210) is then used as a supply for a charge pump 110 that charges the gate of MOSFET 106 to its final value (e.g., 12V above OUT 104). Capacitor C1 (210) discharges if the charge pump 110 current exceeds the C1 (210) charging current. If the voltage drops below a predetermined value (e.g., 4.35V), the charge pump 110 pauses, allowing capacitor C1 (210) to recharge.

The shunt regulators 118 and 202 provide supply voltage to different circuits within overvoltage protection circuit 102. For example, shunt regulator 118 acts as a supply (bypassed by capacitor C1 210) for the charge pump 110 and the overvoltage regulation amplifier 112. As to shunt regulator 202, it provides the "always alive" Vcc 242 supply to logic supply block 204. Thus, overvoltage protection circuit 102 includes a separation of the voltage supplies between the logic supply block 204 and the charge pump 110. For example, resistors 108 and 120 as well as shunt regulators 202 and 118 are used to separate the voltage supplies to different blocks of the overvoltage protection circuit 102. Such separation facilitates isolation between the different supplies and provides independently sizing for resistors 120 and 108. This allows resistor 108 to have a large resistance value, matching the low current requirements of the Vcc supply. Similarly, resistor 120 can be sized as large as possible while the resistor 120 is still able to sink the large charge pump current and $V_{SS}$ current from resistor 108. By allowing both resistors to be sized as large as possible, the power dissipation and the physical size of these resistors is minimized.

Capacitor $C_1$ 210 bypasses the supply between the output node 104 and Vss 130. The capacitor $C_1$ 210 is used in the start mode. The two shunt regulators (i.e., 202 and 118) provide supplies that have a special function during the start mode. For example, the shunt regulator 202 provides an "always alive" (i.e., ON) supply for the Logic block. Thus, different states, such as "shutdown" or "fault" can be readily determined. Further, the shunt regulator 202 also provides a trickle charge to the GATE node 218 for the bootstrapping function.

As to the shunt regulator 118, it provides a high current supply for the charge pump 110 and the overvoltage regulation amplifier 112 in connection with the bootstrapped capacitor C1 210.

In one embodiment, the charge pump 110 uses a substantial amount of current and $R_{IN}$ 108 and $R_{SS}$ 120 may be large (to limit the current for the $V_{DD}$ 222 and $V_{SS}$ 130 supplies respectively). The charge pump is "bootstrapped" through $C_1$ 210.

With the foregoing overview of the overvoltage protection system, it may be helpful now to provide a high-level example of the bootstrapping function. $V_{DD}$ pin 222 through shunt regulator 202 provides a trickle current to the gate of the MOSFET 106. The MOSFET 106 is then used to charge capacitor $C_1$ 210. Capacitor $C_1$ 210 in turn supplies current to the charge pump 110. Charge pump 110 provides current to the gate of the MOSFET 106, which in turn charges $C_1$ 210.

Communication between circuits referenced to ground and the overvoltage protection 102 is available despite floating the overvoltage protection circuit 102. For example, a grounded resistor on the $\overline{SD}$ pin 226 may activate a part shutdown by pulling the pin 226 below the shutdown ($\overline{SD}$) comparator 216 threshold. For example, the part shutdown may be activated by pulling the $\overline{SD}$ pin 226 below the SD comparator 216 threshold for 1 ms. The shutdown state may clamp the GATE pin 218 to the OUT pin 104 and may reduce the quiescent current for all blocks until the $\overline{SD}$ pin 226 is reset. The quiescent current may be reduced to 10 uA.

The overvoltage protection circuit 102 prevents an overvoltage on the input supply 101 from reaching the load connected to $V_{OUT}$ 104. During normal operation, the MOSFET 106 is fully ON, powering the load coupled to $V_{OUT}$ 104 with very little voltage drop. As the voltage at the input 101 increases, the voltage at pin OUT 104 increases until the voltage at OUT 104 reaches a regulation level ($V_{REG}$). Any further voltage increase is provided across the MOSFET 106. The MOSFET 106 is still ON, so the overvoltage protection circuit provides uninterrupted operation during a brief (e.g., 1 ms to 300 ms) overvoltage event.

In one example, the $V_{REG}$ level (i.e., the regulated voltage at output 104) is configured with two feedback resistors, $R_{FB1}$ and $R_{FB2}$ (114 and 116 respectively). The overvoltage regulation amplifier 112 compares the voltage at the FB pin 224 to a predetermined threshold (e.g., 1.23V) below the OUT 104 pin. During regulation, the drop across $R_{FB1}$ 114 is commensurate to the predetermined threshold (e.g., 1.23V), while the remainder of the $V_{REG}$ voltage is provided across $R_{FB2}$ 116.

In one example, when the output 104 is at a regulation point, a timer is started to prevent excessive power dissipation in the MOSFET 106. Normally, the TIMER pin 212 is held LOW with a predetermined pull-down current (e.g., 1.8 μA). During regulation, the TIMER pin 212 charges with a predetermined current (e.g., 9 μA). If the regulation point is held long enough for the TIMER pin 212 to reach a predetermined voltage level (e.g., 2.8V in the example of FIG. 2), then an overvoltage fault is latched in the logic and timer block 232. For example, the equation for setting the timer capacitor can be adjusted by capacitor $C_T$ 228:

$$C_T = 3.5 \cdot t [nF/ms]$$

As discussed above, in one embodiment, the overvoltage protection circuit 102 self starts (e.g., via a timer), while in another embodiment it remains latched OFF until reset by toggling the $\overline{SD}$ pin 226. The cool-down period may be nine seconds, which provides a very low pulsed power duty cycle.

Figure 3:
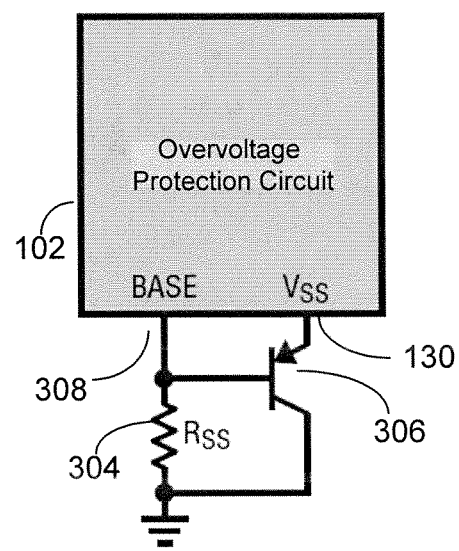
FIG. 3 Illustrates an overvoltage protection circuit block with a PNP on the return line and a resistor on the BASE pin in accordance with an embodiment of the invention.

FIG. 3 illustrates an overvoltage protection circuit 102 with a bipolar transistor (e.g., PNP 306) on the $V_{SS}$ 130 return line and a resistor $R_{SS}$ 304 on the BASE pin 308, in accordance with another embodiment of the invention. The $R_{SS}$ 304 is coupled between the base and collector of bipolar transistor 306. In some embodiments the power resistor for $R_{SS}$ 304 may be physically large. A large value $R_{SS}$ 304 (i.e., lower power and small physical size) may be used in conjunction with a bipolar transistor 306 as illustrated in FIG. 3. For example, in addition to a current (e.g., 0.8 μA) sourced from the BASE pin 308, the base current from the transistor 306 flows through $R_{SS}$ 304, which limits the maximum $R_{SS}$ 304 value. In some embodiments the minimum PNP 306 Beta is as low as 35. In this regard, the base current is 10 μA when the $V_{SS}$ 130 current is 350 μA. Accordingly, this allows a 35 (i.e., Beta) times larger $R_{SS}$ 304 as compared to the embodiment without a bipolar transistor 306. For example, this PNP 306 option may be useful when the MOSFET 106 is in the low resistance state over a large variation in supply voltage 101.

Referring back to FIG. 2, it may be helpful to discuss the MOSFET 106 in more detail. The considerations of the MOSFET include on-resistance ($R_{DS(ON)}$), the maximum drain-source voltage ($V_{(BR)DSS}$), the threshold voltage, and the safe operation area (SOA).

For example, The maximum allowable drain-source voltage of the MOSFET 106 is higher than the supply voltage $V_{SS}$. If the output is shorted to ground or during an overvoltage event, the full supply voltage $V_{SS}$ appears across the MOSFET 106.

In one embodiment, the SOA of the MOSFET 106 encompasses all fault conditions. In normal operation the pass transistor (i.e., MOSFET 106) is fully ON, dissipating very little power. But during overvoltage faults, the GATE pin 218 is used to regulate the output voltage 104 through the MOSFET 106. Large current (e.g., 10 A and higher) and high voltage drop (e.g., 100V and higher) across the MOSFET can coexist in these cases.

Zener diode 150 of FIG. 2 is a clamp configured to drive the base of an external PNP (e.g., 306 of FIG. 3). In one embodiment, diode 150 is enabled while (Zener diode 118 is disabled) when the BASE pin 140 drops below the Vss pin 130. Such drop in voltage indicates that a PNP is connected to the BASE 140 and Vss 130.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An overvoltage protection circuit comprising:
   a positive supply node;
   an output node;
   a negative supply node;
   a first functional circuit including a charge pump and configured to turn ON a MOSFET and to maintain the MOSFET in a low resistance state;
   a second functional circuit configured to detect an overvoltage and control a gate of the MOSFET to regulate a voltage at the output node; and
   a third functional circuit configured to limit magnitude of overvoltage applied across the overvoltage protection circuit;
   wherein the positive and negative supply nodes are configured to be connected to a positive power supply and ground respectively through external components such that the overvoltage protection circuit is operative to float with a voltage applied to the positive supply node.

2. The overvoltage protection circuit of claim 1 wherein the overvoltage protection circuit regulates its own operating voltages such that it operates substantially independently of an overvoltage at the positive supply node.

3. The overvoltage protection circuit of claim 1, wherein:
   the MOSFET is an external component, and
   the gate of the MOSFET is coupled to an output of the charge pump.

4. The overvoltage protection circuit of claim 1, wherein the first functional circuit of the overvoltage protection circuit includes at least one charge pump configured to drive the gate of the MOSFET and to maintain the MOSFET ON in a low resistance state.

5. The overvoltage protection circuit of claim 4, wherein the at least one charge pump is configured to drive the gate of the MOSFET above a positive power supply level and above a predetermined voltage level at the output node.

6. The overvoltage protection circuit of claim 1, wherein the external components include:
   at least one resistance element coupled between the positive supply node of the overvoltage protection circuit and the positive power supply; and
   at least one resistance element coupled between the negative supply node of the overvoltage protection circuit and ground.

7. The overvoltage protection circuit of claim 6, wherein the at least one resistance element coupled between the positive supply node of the overvoltage protection circuit and the positive power supply and the at least one resistance element coupled between the negative supply node of the overvoltage protection circuit and ground are each one of (i) a resistor or (ii) a constant current transistor.

8. The overvoltage protection circuit of claim 1, wherein the overvoltage protection circuit further comprises at least one shunt regulator configured to clamp a predetermined voltage between the output node and the negative supply node of the overvoltage protection circuit.

9. The overvoltage protection circuit of claim 1, wherein the overvoltage protection circuit further comprises at least one shunt regulator configured to clamp a predetermined voltage between the output node and a base node of the overvoltage protection circuit.

10. The overvoltage protection circuit of claim 1, wherein the overvoltage protection circuit further comprises at least one shunt regulator configured to clamp a predetermined voltage between the positive supply node and the negative supply node of the overvoltage protection circuit.

11. The overvoltage protection circuit of claim 10, wherein the overvoltage protection circuit further comprises a logic and timer block that prevents a shoot-through current from logic circuits.

12. The overvoltage protection circuit of claim 11, wherein:

the second functional circuit of the overvoltage protection circuit includes an overvoltage regulation amplifier configured to drive the gate of the MOSFET; and the at least one shunt regulator configured to clamp the predetermined voltage between the output node and the negative supply node and the output node is a supply for the charge pump and the overvoltage regulation amplifier.

13. The overvoltage protection circuit of claim 12, wherein the at least one shunt regulator configured to clamp the predetermined voltage between the positive supply input node and the negative supply node of the overvoltage protection circuit provides an always ON supply to the logic and timer block.

14. The overvoltage protection circuit of claim 10, wherein the output node is bootstrapped to itself through the charge pump, wherein an output capacitor powers the charge pump; and the output capacitor is coupled between the output node and the negative supply node.

15. The overvoltage protection circuit of claim 4, wherein the second functional circuit of the overvoltage protection circuit is further configured to provide a cool-down function to prevent the MOSFET from overheating.

16. The overvoltage protection circuit of claim 15, wherein the second functional circuit of the overvoltage protection circuit is further configured to one of at least:

regulate an ON time of the MOSFET;

start at least one timer upon detecting a fault state; and maintain the MOSFET OFF until at least one of (i) a predetermined time has elapsed after the detecting the fault state and (ii) an input to a shutdown comparator is reset.

17. The overvoltage protection circuit of claim 6, wherein the output node of the overvoltage protection circuit is capacitively coupled to the negative supply node by at least one external capacitor.

18. The overvoltage protection circuit of claim 17, wherein the voltage at the output node of the overvoltage protection circuit is pulled up by the MOSFET and the voltage at the negative supply node is pulled low by the at least one resistor coupled between the negative supply node of the overvoltage protection circuit and a ground, until the negative supply node is clamped to a predetermined voltage by the at least one shunt regulator configured to clamp a predetermined voltage between the output node and the negative supply node of the overvoltage protection circuit.

19. The overvoltage protection circuit of claim 18, wherein during an overvoltage event, the voltage at the output node is clamped by regulating the gate of the MOSFET.

20. The overvoltage protection circuit of claim 5:

wherein the overvoltage protection circuit further comprises an overvoltage amplifier configured to monitor the voltage at the output node using a first feedback resistor and a second feedback resistor;

wherein a negative node of the overvoltage amplifier is connected to both the first feedback resistor and second feedback resistor, an other end of the first feedback resistor is connected to the output node, and an other end of the second feedback resistor is connected to a ground; and wherein, during an overvoltage event, the overvoltage amplifier controls a discharge of the gate of the MOSFET with a predetermined current until the voltage at the output node is regulated.

21. The overvoltage protection circuit of claim 3, wherein external components include:

at least one resistor coupled between the positive supply node of the overvoltage protection circuit and a positive power supply;

at least one PNP coupled between the negative supply node of the overvoltage protection circuit and ground; and at least one resistor between the base of the PNP and ground.

22. A method of regulating an output voltage, the method comprising:

regulating an operating voltage of an overvoltage protection circuit substantially independently of voltage operating ranges of internal circuit components of the overvoltage protection circuit;

providing a regulated voltage at an output node of an overvoltage protection circuit;

monitoring an input voltage at a positive supply input node of the overvoltage protection circuit;

floating the overvoltage protection circuit with a voltage applied to the positive supply node; and upon detecting an overvoltage at the positive supply node, preventing the overvoltage from reaching the output node of the overvoltage protection circuit.

23. The method of claim 22, further comprising turning ON a MOSFET and maintaining the MOSFET in a low resistance state.

24. The method of claim 22, further comprising regulating operating voltages of the overvoltage protection circuit such that the overvoltage protection circuit operates substantially independently of an overvoltage at the positive supply node.

25. The method of claim 22, further comprising driving a gate of the MOSFET to maintain the MOSFET ON in a low resistance state, wherein the driving is by a charge pump.

26. The method of claim 24, further comprising:

driving the gate of the MOSFET above a positive power supply level and above a predetermined level of a voltage at the output node of the overvoltage protection circuit; and coupling a MOSFET to the output node of the overvoltage protection circuit.

27. The method of claim 22, further comprising:

coupling at least one resistance element between the positive supply node of the overvoltage protection circuit and a positive power supply; and coupling at least one resistance element between the negative supply node of the overvoltage protection circuit and a ground.

28. The method of claim 27, wherein the at least one resistance element coupled between the positive supply node of the overvoltage protection circuit and the positive power supply and the at least one resistance element coupled between the negative supply node of the overvoltage protection circuit and ground are each one of (i) a resistor or (ii) a constant current transistor.

29. The method of claim 22, further comprising clamping a predetermined voltage between the output node and the negative supply node of the overvoltage protection circuit.

30. The method of claim 22, further comprising clamping a predetermined voltage between the output node and a base node of the overvoltage protection circuit.

31. The method of claim 22, further comprising clamping a predetermined voltage between the positive supply node and the negative supply node of the overvoltage protection circuit.

32. The method of claim 31, further comprising preventing a shoot-through current from logic circuits.

33. The method of claim 24, further comprising bootstrapping an output capacitor to the charge pump.

34. The method of claim 24, further comprising cooling-down the MOSFET.

35. The method of claim 34, further comprising:
regulating an ON time of the MOSFET;
starting at least one timer upon detecting a fault state; and
maintaining the MOSFET OFF until at least one of (i) a predetermined time has elapsed after the detecting the fault state (ii) and an input to a shutdown comparator is reset.

36. The method of claim 27, further comprising capacitively coupling at least one external capacitor between the negative supply node and the output node.

37. The method of claim 36, further comprising:
pulling up the voltage at the output node of the overvoltage protection circuit by a MOSFET; and
pulling low the voltage at the negative supply node by the at least one resistor coupled between the negative supply node of the overvoltage protection circuit and a ground, until the negative supply node is clamped to a predetermined voltage by the at least one shunt regulator configured to clamp a predetermined voltage between the output node and the negative supply node of the overvoltage protection circuit.

38. The method of claim 37, further comprising clamping the voltage at the output node during an overvoltage event by regulating a gate of the MOSFET.

39. The method of claim 27, further comprising:
monitoring the voltage at the output node using a first feedback resistor and a second feedback resistor; and
upon determining an overvoltage event, controlling a discharge of a gate of a MOSFET with a predetermined current until the voltage at the output node is regulated.

* * * * *